United States Patent
Iwaki

(10) Patent No.: US 11,200,618 B2
(45) Date of Patent: Dec. 14, 2021

(54) CHARGING SYSTEM AND CHARGING METHOD FOR RENTED UNIT FOR SUBSTRATE-RELATED OPERATION MACHINE

(71) Applicant: FUJI CORPORATION, Chiryu (JP)

(72) Inventor: Noriaki Iwaki, Hekinan (JP)

(73) Assignee: FUJI CORPORATION, Chiryu (JP)

( * ) Notice: Subject to any disclaimer, the term of this patent is extended or adjusted under 35 U.S.C. 154(b) by 184 days.

(21) Appl. No.: 16/618,468

(22) PCT Filed: Jun. 14, 2017

(86) PCT No.: PCT/JP2017/021974
§ 371 (c)(1),
(2) Date: Dec. 2, 2019

(87) PCT Pub. No.: WO2018/229900
PCT Pub. Date: Dec. 20, 2018

(65) Prior Publication Data
US 2021/0150620 A1   May 20, 2021

(51) Int. Cl.
*G06Q 50/00* (2012.01)
*G06Q 30/06* (2012.01)
(Continued)

(52) U.S. Cl.
CPC ..... *G06Q 30/0645* (2013.01); *G06Q 30/0283* (2013.01); *G06Q 50/04* (2013.01); *G06Q 50/08* (2013.01)

(58) Field of Classification Search
CPC ........... G06Q 30/0283; G06Q 30/0645; G06Q 50/04; G06Q 50/08; G06Q 90/30
See application file for complete search history.

(56) References Cited

U.S. PATENT DOCUMENTS

2003/0120509 A1*  6/2003  Bruch .................... G06Q 10/10
                                                    705/307
2003/0125961 A1*  7/2003  Janda ................... G06Q 10/087
                                                    705/307
(Continued)

FOREIGN PATENT DOCUMENTS

JP        2003-28070 A        1/2003
JP        2003028070    *     1/2003   ............. G06Q 50/00

OTHER PUBLICATIONS

International Search Report dated Aug. 29, 2017 in PCT/JP2017/021974 filed Jun. 14, 2017.

*Primary Examiner* — Luis A Brown
(74) *Attorney, Agent, or Firm* — Oblon, McClelland, Maier & Neustadt, L.L.P.

(57) ABSTRACT

A charging system including a recognizing section provided on the main body and configured to recognize individual identification information of the rented unit attached to the main body; an attachment position information memory section configured to memorize a relationship between an attachment position of the main body to which the rented unit is attached and the individual identification information of the rented unit attached to the main body; an operating information acquiring section provided on the main body and configured to acquire operating information of the rented unit attached to the main body; an operating information memory section configured to memorize the operating information for each of the individual identification information; and a charge calculating section configured to calculate a charging amount based on the operating information memorized on the operating information memory section.

8 Claims, 7 Drawing Sheets

(51) Int. Cl.
   *G06Q 30/02*    (2012.01)
   *G06Q 50/04*    (2012.01)
   *G06Q 50/08*    (2012.01)

(56) References Cited

U.S. PATENT DOCUMENTS

| | | | |
|---|---|---|---|
| 2004/0006517 A1* | 1/2004 | Takatori | G06Q 30/0645 |
| | | | 705/26.1 |
| 2004/0215469 A1* | 10/2004 | Fukushima | G06Q 30/0601 |
| | | | 705/26.1 |
| 2010/0138266 A1* | 6/2010 | Nichols | G06Q 10/087 |
| | | | 705/7.23 |
| 2010/0299172 A1* | 11/2010 | Nottoli | G06Q 10/06 |
| | | | 705/7.18 |
| 2011/0060454 A1* | 3/2011 | Lowe | G06Q 30/0645 |
| | | | 700/232 |
| 2011/0078074 A1* | 3/2011 | Lipman | G06Q 99/00 |
| | | | 705/39 |
| 2013/0035978 A1* | 2/2013 | Richardson | G06Q 30/0283 |
| | | | 705/7.27 |
| 2014/0100972 A1* | 4/2014 | Kropp | G07F 17/0042 |
| | | | 705/16 |
| 2017/0018012 A1* | 1/2017 | Shinohara | G06Q 30/0283 |

\* cited by examiner

Unit recognition when power is turned on or the like

| Time | Device type | Operation machine ID | State | Unit type | Unit ID |
|---|---|---|---|---|---|
| 20170501 10:24:10 | TYPEA | 10002005 | On | HeadA | 00000001 |
| 20170501 10:24:10 | TYPEA | 10002005 | On | Feeder | 00000001 |
| 20170501 10:24:10 | TYPEA | 10002005 | On | Feeder | 00000002 |
| 20170501 10:24:10 | TYPEA | 10002005 | On | Feeder | 00000003 |
| 20170501 10:24:10 | TYPEA | 10002005 | On | MTUA | 00000010 |
| 20170501 10:24:10 | TYPEA | 10002005 | On | MFU | 00000010 |
| 20170501 10:24:10 | TYPEA | 10002005 | On | Nozzle | 00001111 |
| 20170501 10:24:10 | TYPEA | 10002005 | On | NGConveyor | 00000001 |
| 20170501 10:24:10 | TYPEA | 10002005 | On | NozzleClean | 00001111 |

FIG. 4

When automatic exchange is performed during device operation

| Time | Device type | Operation machine ID | State | Unit type | Pre-exchange unit ID | Post-exchange unit ID |
|---|---|---|---|---|---|---|
| 20170501 10:24:10 | TYPEA | 10002005 | On | HeadA | 00000001 | 00000002 |

FIG. 5

When device completes production of one substrate

| Time | Device type | Operation machine ID | State | Unit type | Unit ID | Operating speed (%) | Operating quantity | Error quantity |
|---|---|---|---|---|---|---|---|---|
| 20170501 10:24:10 | TYPEA | 10002005 | On | HeadA | 00000001 | 100 | 40 | 0 |
| 20170501 10:24:10 | TYPEA | 10002005 | On | HeadA | 00000001 | 80 | 10 | 0 |
| 20170501 10:24:10 | TYPEA | 10002005 | On | HeadA | 00000001 | 50 | 5 | 0 |
| 20170501 10:24:10 | TYPEA | 10002005 | On | Feeder | 00000001 | 100 | 31 | 1 |
| 20170501 10:24:10 | TYPEA | 10002005 | On | Feeder | 00000001 | 70 | 10 | 0 |
| 20170501 10:24:10 | TYPEA | 10002005 | On | Feeder | 00000002 | 100 | 10 | 0 |
| 20170501 10:24:10 | TYPEA | 10002005 | On | Feeder | 00000003 | 50 | 5 | 0 |

When used outside rental conditions

CHARGING SYSTEM AND CHARGING METHOD FOR RENTED UNIT FOR SUBSTRATE-RELATED OPERATION MACHINE

TECHNICAL FIELD

The present specification relates to a charging system and charging method for a rented unit for a substrate-related operation machine.

BACKGROUND ART

Generally, when performing contract production or high-mix low-volume production involving mounting (including surface mounting and insertion) of components such as electronic components and the like on a substrate, different machine quantities and device capabilities are required depending on the type of substrate being produced. In such cases, substrate producers may consider owning their own equipment with specifications that cover all needs, but this increases the burden of capital investment. Therefore, in order to reduce the burden of capital investment, substrate producers may consider borrowing all the required equipment from a leasing company for a predetermined lending period. However, if all the equipment required borrowed as leased items are substrate-related operation machines, for contract production or high-mix low volume production, the usage frequency may be low due to changes in the product types, and some leased items will be equipment units that are hardly used, which does not make sense for the substrate producer from the point of view of the leasing charges.

Therefore, in order to further reduce the burden of capital investment on substrate producers, it is conceivable to base leasing charges on the operating hours during which the leased products are actually operating, not on the periods for which the leased products are lent (see, for example, patent literature 1). According to this method of charging, even if all the required equipment is a leased item, the charging amount becomes smaller when the usage frequency of use of the leased item is low due to changes in the product types or the like than when there are many. Therefore, it is possible to perform appropriate charging in accordance with the actual frequency of use.

CITATION LIST

Patent Literature

Patent literature 1: JP-A-2003-28070

BRIEF SUMMARY

Technical Problem

Generally, substrate-related operation machines have a device configuration in which units such as a head for picking up components, a component feeder for supplying components, and a board conveying unit can be flexibly replaced to change the device specifications. Therefore, it is convenient and efficient from the point of view of capital investment for a substrate producer to own a device main body and required units, and to rent less frequently used units from a leasing company. However, there is no mechanism for allowing individual units of a substrate-related operation machine to be rented and charging by the rented unit.

An object of the present disclosure is to provide a charging system and a charging method for a rented unit for a substrate-related operation machine, configured such that charging is performed in accordance with the operation of the rented unit of the substrate-related operation machine.

Solution to Problem

Disclosed herein is a charging system for a rented unit for a substrate-related operation machine, the substrate-related operation machine having a main body configured such that multiple units can be removably attached, at least one of the multiple units being a rented unit that is rented, the charging system including: a recognizing section provided on the main body and configured to recognize individual identification information of the rented unit attached to the main body; an attachment position information memory section configured to memorize a relationship between an attachment position of the main body to which the rented unit is attached and the individual identification information of the rented unit attached to the main body; an operating information acquiring section provided on the main body and configured to acquire operating information of the rented unit attached to the main body; an operating information memory section configured to memorize the operating information for each of the individual identification informations; and a charge calculating section configured to calculate a charging amount based on the operating information memorized on the operating information memory section.

Also disclosed herein is a charging method for a rented unit for a substrate-related operation machine, the substrate-related operation machine having a main body configured such that multiple units can be removably attached, at least one of the multiple units being a rented unit that is rented, the charging method including: a first step of the main body recognizing individual identification information of the rented unit attached to the main body; a second memorizing step of a rented unit attachment position information memory section memorizing a relationship between an attachment position of the main body to which the rented unit is attached and the individual identification information of the rented unit attached to the main unit; a third step of the main body acquiring operating information of the rented unit attached to the main body; a fourth step of an operating information memory section memorizing the operating information for each of the individual identification informations; and a fifth step of a charge calculating section calculating a charging amount based on the operating information memorized on the operating information memory section.

According to the disclosure, it is possible to construct a system in which, when at least one of all the units attached to a substrate-related operation machine is a rented unit, charging is performed in accordance with the operating of the rented unit.

BRIEF DESCRIPTION OF DRAWINGS

FIG. 2 is a plan view of a substrate-related operation machine used in the embodiment.

FIG. 3 is a diagram showing an example of log information that is uploaded from a substrate-related operation machine to a management server while the power of the substrate-related operation machine is turned on.

FIG. 4 is a diagram showing an example of log information that is uploaded from a substrate-related operation machine to a management server when a unit is automatically exchanged while the substrate-related operation machine is operating.

FIG. 5 is a diagram showing an example of log information that is uploaded from a substrate-related operation machine to a management server when the substrate-related operation machine has completed production of one substrate.

DESCRIPTION OF EMBODIMENTS

1. Configuration of Charging Systems for Rented Units for Substrate-Related Operation Machine The configuration of charging system for rented unit for substrate-related operation machine 1 of an embodiment is described below with reference to FIGS. 1 to 6. Charging system 1 is a system for performing lease charging when at least one of the units removably attached to main body 11 in substrate-related operation machine 10 is a rented unit.

Figure 1:
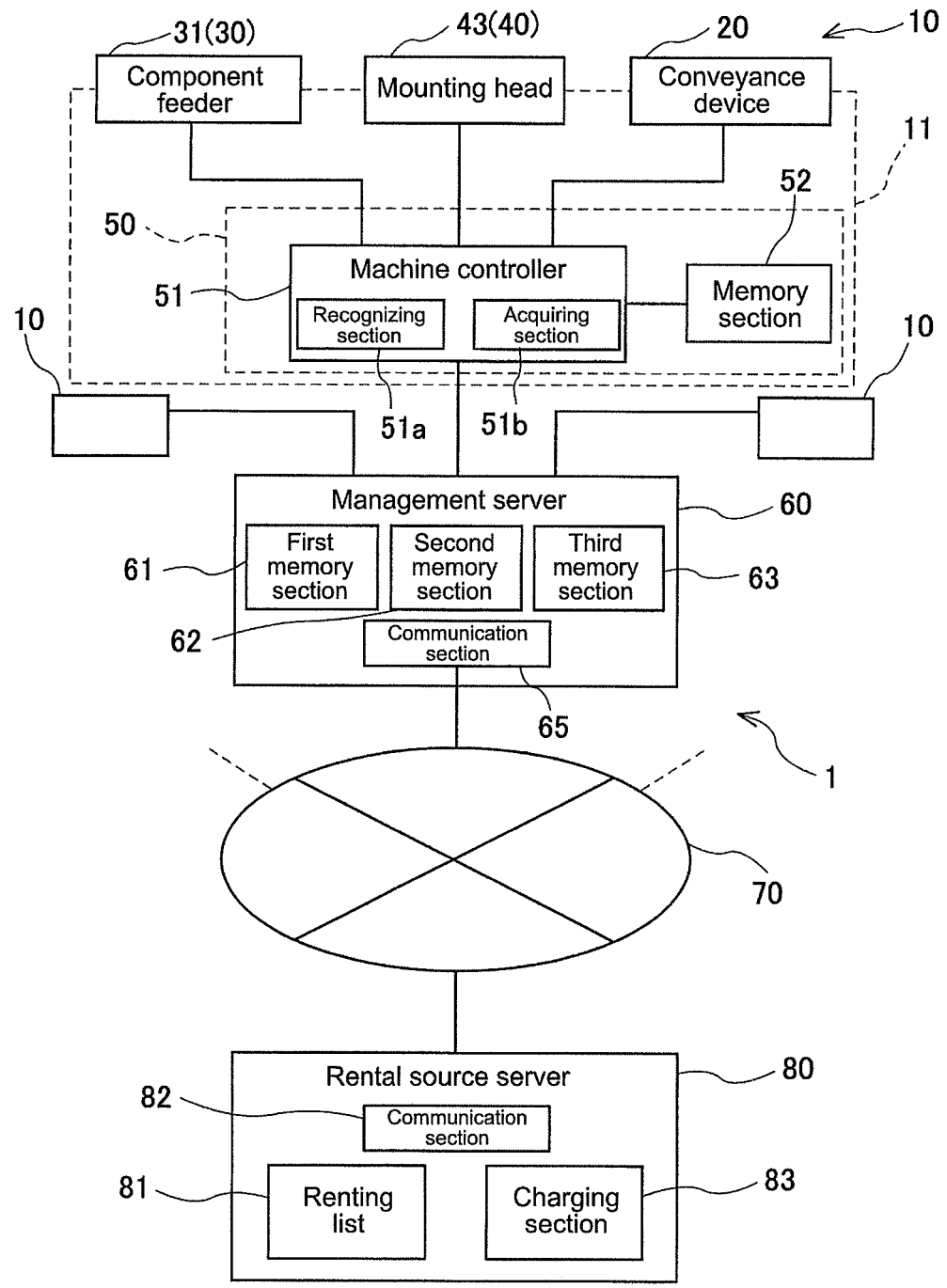
FIG. 1 is a configuration diagram of a charging system for a rented unit for a substrate-related operation machine according to an embodiment.
Figures 2, 3:
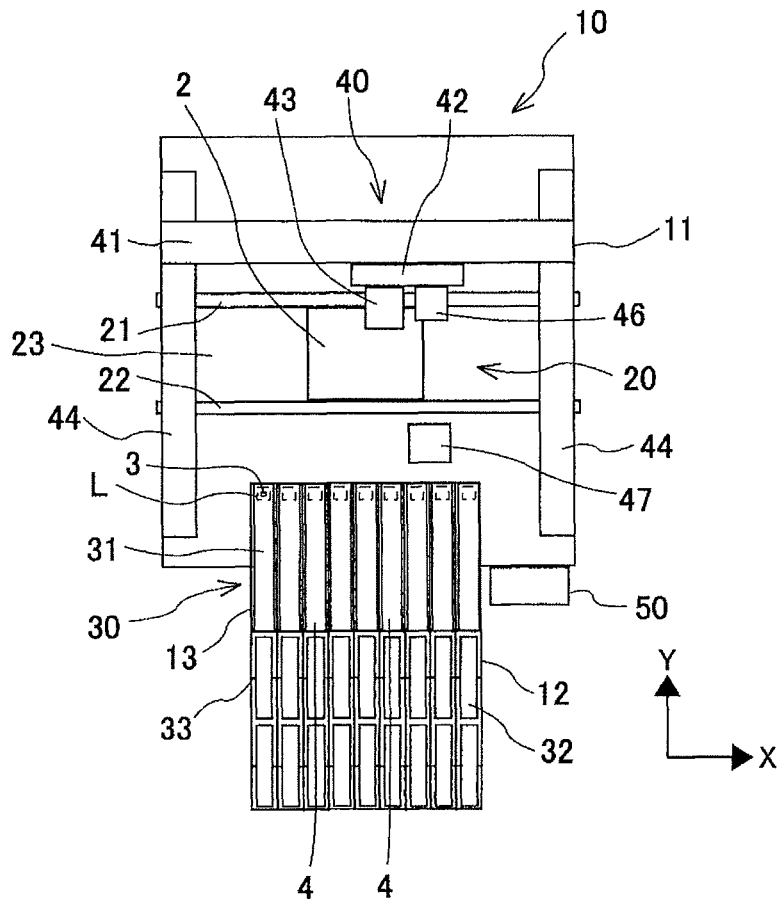

Substrate-related operation machine 10 is a device for mounting a component to substrate 2 such as a circuit board. Substrate-related operation machine 10 includes non-removable main body 11 and, as shown in FIG. 2, board conveyance device 20, component supply device 30, and component transfer device 40. Each of board conveyance device 20, component supply device 30, and component transfer device 40 is attached by being mounted on main body 11.

Board conveyance device 20 is a device for conveying substrate 2. As shown in FIG. 2, board conveyance device 20 includes pair of guide rails 21 and 22, conveyor belt 23, and a clamp device (not shown). The pair of guide rails 21 and 22 are arranged in parallel with each other with a space therebetween. Guide rails 21 and 22 guide substrate 2 in conveyance direction X. Conveyor belt 23 is a belt member on which substrate 2 can be mounted, and is provided to be rotatable by an electric motor or the like. Substrate 2 is conveyed in conveyance direction X by conveyor belt 23 while being guided by pair of guide rails 21 and 22. The clamp device is arranged on conveyor belt 23. The clamp device can clamp substrate 2 at a predetermined component mounting position in conveyance direction X. When substrate 2 has been conveyed to a predetermined component mounting position by conveyor belt 23, it is positioned by a clamp device. Conveyor belt 23, guide rails 21, 22, and the clamp device of board conveyance device 20 can be appropriately exchanged according to the type, size, shape, and the like of substrate 2.

Component supply device 30 is a device for supplying components 3 to be mounted on substrate 2 to predetermined feeding position L. Main body 11 has holding section 12 for holding component feeder 31. Holding section 12 has multiple slots 13 arranged side by side in the conveying direction X. Each slot 13 is assigned a different slot number, and component feeders 31 are removably and interchangeably held one by one. The multiple slots 13 can hold different types of component feeders 31. Main body 11 may be capable of holding a tray on which components larger than those held by a component feeder 31 are loaded, and may be capable of exchanging component feeder 31 with the tray.

Component feeder 31 has reel holding shaft 33 for detachably and rotatably holding reel 32. Reel 32 is a rotating body on which carrier tape containing multiple components 3 is wound. Reels 32 are provided for each type of component 3. Each reel 32 can accommodate a quantity of components 3 corresponding to the type of each accommodated component.

Component feeder 31 is a device for feeding the carrier tape wound around reel 32 held by reel holding shaft 33. This feeding by component feeder 31 is performed by feeding the carrier tape in a specified supply direction (specifically, in a direction from the tape insertion hole at the rear to the specified supply position L side). Component feeder 31 includes: a sprocket having teeth which engage in sprocket holes provided in the carrier tape; and an electric motor that rotates the sprocket. In component feeder 31, when the electric motor is operated, the sprocket rotates and the carrier tape travels in the specified supply direction, whereby components 3 are supplied to a specified supply position L.

Component transfer device 40 is a device for transferring component 3 supplied to the specified supply position L toward the substrate 2 positioned at the specified component mounting position. Component transfer device 40 includes Y-axis slider 41, X-axis slider 42, and mounting head 43.

Y-axis slider 41 is supported by guide rail 44. Guide rail 44 extends in a direction orthogonal to the conveyance direction X of substrate 2 by board conveyance device 20 (hereinafter, referred to as an orthogonal direction Y), and is arranged vertically above board conveyance device 20. Y-axis slider 41 is movable along guide rail 44 in a perpendicular Y-direction. A Y-axis servo motor (not shown) is mechanically coupled to Y-axis slider 41. Y-axis slider 41 is moved along guide rail 44 in the perpendicular Y-direction by the Y axis servos motor.

X-axis slider 42 is attached to Y-axis slider 41 so as to be movable in conveyance direction X. An X-axis servo motor (not shown) fixed to Y-axis slider 41 is mechanically connected to X axis slider 42. X-axis slider 42 is moved in conveyance direction X by the X-axis servo motor.

Mounting head 43 is attached to X axis slider 42. Mounting head 43 holds suction nozzles capable of picking up component 3. Note that, mounting head 43 may be capable of pickup with multiple suction nozzles at the same time. Mounting head 43 or the suction nozzles are detachable to and from X-axis slider 42 or mounting head 43 so as to be interchangeable. Mounting head 43 or the suction nozzles held by the mounting head 43 can be appropriately exchanged in accordance with the type, size, shape, or the like of components 3. Mounting head 43 is positionally movable with respect to X-axis slider 42 in a vertical direction Z orthogonal to both conveyance direction X and orthogonal direction Y. A suction nozzle of mounting head 43 uses negative pressure or the like to pick up a component 3 that has arrived at the specified supply position L of component supply device 30, and releases the picked up component 3 to mount the component 3 on substrate 2 positioned at the specified component mounting position.

Board camera 46 is attached to X-axis slider 42. Board camera 46 captures an image of reference marks of substrate 2 positioned at the specified component mounting position from above to acquire board position reference information, and captures an image of component 3 arriving at the specified supply position L from above to acquire component position information. The component position information is used for position control and orientation control of the suction nozzle when the component 3 is held by the suction nozzle of mounting head 43. Further, the board position reference information is used for position control and attitude control of the suction nozzle when the component 3 held by the suction nozzle of mounting head 43 is mounted on board 2.

Also, component camera 47 is attached to the base of component transfer device 40. Component camera 47 captures an image of the component 3 held by the suction nozzle of mounting head 43 from below, and acquires orientation data of the component 3 and the like. This orientation data is used for position control and orientation control of the suction nozzle when the component 3 held by the suction nozzle of mounting head 43 is mounted on substrate 2.

Further, substrate-related operation machine 10 further includes control device 50 attached to main body 11. Control device 50 includes machine controller 51 mainly composed of a computer provided with a CPU, ROM, RAM, and the like. Machine controller 51 is connected to an imaging processing device or the like for processing image data obtained by board camera 46 and component camera 47. Machine controller 51 is capable of controlling the operation of the respective devices 20, 30, and 40 of the substrate-related operation machine 10 based on the inputted information.

Also, machine controller 51 has recognizing section 51a. Recognizing section 51a recognizes unit individual identification information assigned to various units attached to main body 11 of the corresponding substrate-related operation machine 10. The unit individual identification information is an identification code assigned to each of the units that can be attached to substrate-related operation machine 10, and is identification information for distinguishing the unit from other units. Units to which the unit individual identification information is assigned are mounting head 43 or component feeder 31 exchangeably attached to devices 20, 30, and 40, a suction nozzle or gripping chuck held by mounting head 43, or various types of processing devices mounted in place of component feeder 31 on component supply device 30 (for example, a supply device for supplying flux to be transferred to a component, a collecting device for collecting waste components, a cleaning device for cleaning a nozzle of mounting head 43), or the like.

Recognition of the unit individual identification information by recognizing section 51a described above may be performed by the following method. For example, as one recognizing method, a computer or the like loaded on each of the devices 20, 30, and 40 mounted on the substrate-related operation machine 10 detects unit individual identification information of units included in each of the devices 20, 30, and 40, and transmits the unit individual identification information to machine controller 51, and machine controller 51 receives and recognizes the unit individual identification information transmitted from each of the devices 20, 30, and 40. Further, as another recognizing method, unit individual identification information is affixed to a specified position on the outer surface of the unit of the devices 20, 30, and 40, and provided are a camera for capturing the unit individual identification information, and a reader for reading the unit individual identification information, and machine controller 51 recognizes the unit individual identification information of the units mounted on the devices 20, 30, and 40 based on the information from the camera, the reader, and the like.

Machine controller 51 stores the unit individual identification information of the unit attached to main body 11 of substrate-related operation machine 10 recognized by recognizing section Ma as described above in memory section 52 in association with the attachment position of main body 11 to which the unit is attached (for example, the slot number in which component feeder 31 is loaded). Memory section 52 memorizes the relationship between the attachment position of main body 11 to which the unit attached to self-substrate-related operation machine 10 is attached and the unit individual identification information of the unit.

Machine controller 51 of each substrate-related operation machine 10 is connected to management server 60 provided in a factory or the like in which each substrate-related operation machine 10 is installed. Management server 60 is a host computer that manages supply of components 3, production of substrates 2, the operating states of substrate-related operation machine 10, and production plans that use substrate-related operation machine 10 (there may be multiple machines in the factory). Production plans include a production plan of multiple types of substrate 2 over a predetermined period (for example, one week or one month) in the future, and also includes a use plan indicating the types and quantities of components 3 to be used in accordance with the production plan of the substrate 2. Note that, these production plans may be sequentially updated. Management server 60 memorizes production plans of substrates 2 and usage plans of components 3.

Management server 60 memorizes unit individual identification information of attached units (for example: guide rails 21, 22 and conveyor belt 23 of board conveyance device 20; component feeders 31 of component supply device 30; reels 32 held in component feeders 31; suction nozzles held by mounting head 43 of component transfer device 40) in association with each substrate-related operation machine 10 to be managed. Management server 60 issues a production command to machine controller 51 of the substrate-related operation machine 10 in accordance with a production plan or the like.

Machine controller 51 memorizes the relationship between the production command and the device or component to be used. Upon receiving a production command from management server 60, machine controller 51 performs production of substrate 2 according to the following procedure. That is, machine controller 51 selects a unit of devices 20, 30, and 40 to be operated, that is, used, in accordance with the production command from management server 60 (for example, component feeders 31 to be used from among the component feeders 31 held in the multiple slots 13), identifies the mounting position of main body 11 to which the unit is to be attached, and issues an operating command to the unit.

In addition, machine controller 51 generates log information of units loaded on substrate-related operation machine 10 at a specified timing during operation to produce substrate 2 and while various processing is being performed, and uploads the generated log information to management server 60. The timing for uploading this log information is, for example: when units are identified by power being turned on at substrate-related operation machine 10 or the like; when a unit included in a device 20, 30, or 40 is automatic exchanged while substrate-related operation machine 10 is operating; when automatic operation of substrate-related operation machine 10 is started; when automatic operation of substrate-related operation machine 10 is finished; when substrate-related operation machine 10 has completed production of a substrate.

The above log information is collated information such as the machine name of substrate-related operation machine 10, operation machine individual identification information, a state of substrate-related operation machine 10, a unit type of a unit of devices 20, 30, 40, or the like attached to substrate-related operation machine 10, unit individual identification information, unit operating information, and the like, linked to the acquisition time or the update time. The log information to be uploaded from machine controller 51 to management server 60 may differ depending on the generation timings of the log information.

The log information is, for example, the time, the machine name of substrate-related operation machine 10, the operation machine individual identification information, the state of the operation machine, the unit type, and the unit individual identification information when the unit is recognized, as shown in FIG. 3. During unit automatic exchange, as shown in FIG. 4, the log information is the time, the machine name of substrate-related operation machine 10, the operation machine individual identification information, the state of the operation machine, the unit type, the pre-exchange unit individual identification information, and the post-exchange unit individual identification information. When production is completed of one substrate 2, as shown in FIG. 5, the log information is the time, the machine name of substrate-related operation machine 10, the operation machine individual identification information, the state of the operation machine, the unit type, the unit individual identification information, the operating speed, the operating quantity, and the operating error quantity.

As described above, machine controller 51 sometimes generates log information including unit operating information of units included in respective devices 20, 30, and 40 (specifically, when manufacturing of one substrate 2 is completed). Machine controller 51 has acquiring section 51b for acquiring unit operating information. This unit operating information is information related to the operation of each unit, and is a concept including an operating quantity that quantitatively represents the amount of operation. The operating quantity may be the operating load, operating time, operating times quantity, quantity of operating errors, or the like. The operating load indicates a degree of usage of the device itself due to the operation of the unit attached to main body 11 of substrate-related operation machine 10, and is, for example, the operating speed (%). The operating time may be a duration for which operation is continued from the power being turned on, or may be a total operation time obtained by adding the operating time from power on to power off. Further, the operating times quantity may be, for example, the conveyance quantity of substrate 2 or the like by conveyor belt 23 in the case of board conveyance device 20, the feeding quantity by component feeders 31 in the case of component supply device 30, or the mounting total quantity or pickup quantity by suction nozzles 43 in the case of component transfer device 40.

Management server 60 can acquire log information to be uploaded from machine controller 51 of substrate-related operation machine 10. Management server 60 has first memory section 61. The computer of management server 60 memorizes the log information acquired for each substrate-related operation machine 10 in first memory section 61.

Management server 60 also has second memory section 62. Second memory section 62 memorizes rental yes/no information indicating whether a loaded unit is a unit rented from the rental source (hereinafter, referred to as a rented unit 4) in association with unit individual identification information of the unit attached to each of the substrate-related operation machines 10, and memorizes information including the rental conditions for that rented unit 4. These rental conditions include, for example, information indicating the start of rental, information indicating the end of rental, information indicating the rental period, information indicating the upper limit and the lower limit of the allowable range for operating speed, information indicating the charging unit price, information indicating conditions for changing the charging unit price, the type of the substrate-related operation machine 10 to which the unit can be attached, and the like. Note that, FIG. 2 shows that two of the component feeders 31 loaded in nine slots 13 of component supply device 30 are rented units 4.

Management server 60 forms a portion of charging system 1. Management server 60 may reference the log information of the substrate-related operation machine 10 in first memory section 61 and rental yes/no information of substrate-related operation machine 10 in second memory section 62 to determine whether the attached unit is a rented unit 4, and extract log information for each unit individual identification information of the rented unit 4. Management server 60 has third memory section 61. Third memory section 63 memorizes log information for each unit individual identification information of the rented unit 4.

Management server 60 stores information of a rental source that rents rented unit 4 (for example, a name, a telephone number, a data transmission destination, and the like). Management server 60 has communication section 65 that is connected to network 70. Management server 60 can transmit information from communication section 65 to server 80 of the rental source (also referred to as rental source server 80) via network 70. Network 70 may use an existing line or a dedicated line.

Information transmitted from management server 60 to rental source server 80 is data required for performing charging for the renting of rented unit 4, and is log information associated with the unit individual identification information of rented unit 4 memorized in third memory section 63. The transmission information may include at least the operating information required for charging among the log information. The timing of information transmission from management server 60 to rental source server 80 is periodic, that is, every predetermined period such as one day or one week. Note that, the timing of this information transmission may be when the operating quantity as the operating information in the log information reaches a predetermined amount instead of periodically.

When the above-mentioned information transmission is performed periodically, the operating information to be transmitted collates the information acquired from the previous transmission to the present transmission. For example, even if the log information is acquired multiple times, the information is not transmitted every time the log information is acquired, and the multiple instances of operating information are collected and transmitted once. Note that, the collection of multiple instances of operating information may be a bundle of multiple instances of the operating information as is, or may be a single piece of operating information representing all the multiple instances of operating information.

Rental source server 80 is a portion of charging system 1. Rental source server 80 is a host computer that manages rented units 4 lent from the lending source server to the rental destination. Rental source server 80 holds renting list 81. Renting list 81 is a list of rented units 4, and associates, for each rented unit 4, a management number of the rented unit 4 (that is, unit individual identification information), rental conditions including a rental period, a charging unit price, and the like, information indicating a department in charge and a request destination of a rental destination and the like.

Rental source server 80 has communication section 82 that is connected to network 70. Rental source server 80 can, via communication section 82, receive log information including operating information required for charging associated with the unit individual identification information, which is transmitted from the rental destination management server 60 via network 70. Rental source server 80 has charging section 83. Charging section 83, using communication section 82, extracts the operating information required for charging from the log information received from management server 60 of the rental destination, and calculates the charging amount (that is, the total charging amount) to the rental destination based on the operating information. Then, based on the calculated charging amount, a charging request is made from the rental source to the rental destination.

The total amount of charging to the above-mentioned rental destination varies according to the contents of the operating information, becoming higher as the operating quantity increases. For example, if the charging amount per quantity of operations (that is, the charging unit price) is determined in advance by a contract between the rental source and the rental destination, the total charging amount is determined by multiplying the operating quantity and the charging unit price. Further, the total amount of charging may be an amount corresponding to the above-mentioned operating quantity added to a basic rental fee determined in advance by the contract between the rental source and the rental destination. The above basic rental fee may be increased or decreased in accordance with the rental period.

2. Operation from Rental to Charging of Rented Unit

The rental source that is the owner of the unit is able to individually lend at least one rented unit 4, which is a unit that is attachable to substrate-related operation machine 10 such as board conveyance device 20, component supply device 30, component transfer device 40, and the like, to the rental destination who is a customer and user of substrate-related operation machine 10. The rental destination determines the device specifications of their substrate-related operation machine 10 considering all the types of substrates 2 they may wish to produce, and, considering factors such as the expected production quantity of substrates 2 to be produced, the production period, the product cycle period of the product in which the substrates 2 are used, maintenance functionality of the units, and so on, determines one or more rented units 4 to rent from the rental source within the applicable device specifications. Note that, the rental destination purchases main body 11 of substrate-related operation machine 10 and units other than rented units 4. The rental destination enters into a contract for renting the rented units with the rental source and then receives the rented units 4. Upon the rental source and the rental destination entering into a contract regarding rented units 4, information including the rental conditions linked to the unit individual identification information of the rented units 4 is saved in rental source server 80 and rental destination management server 60.

Figure 6:
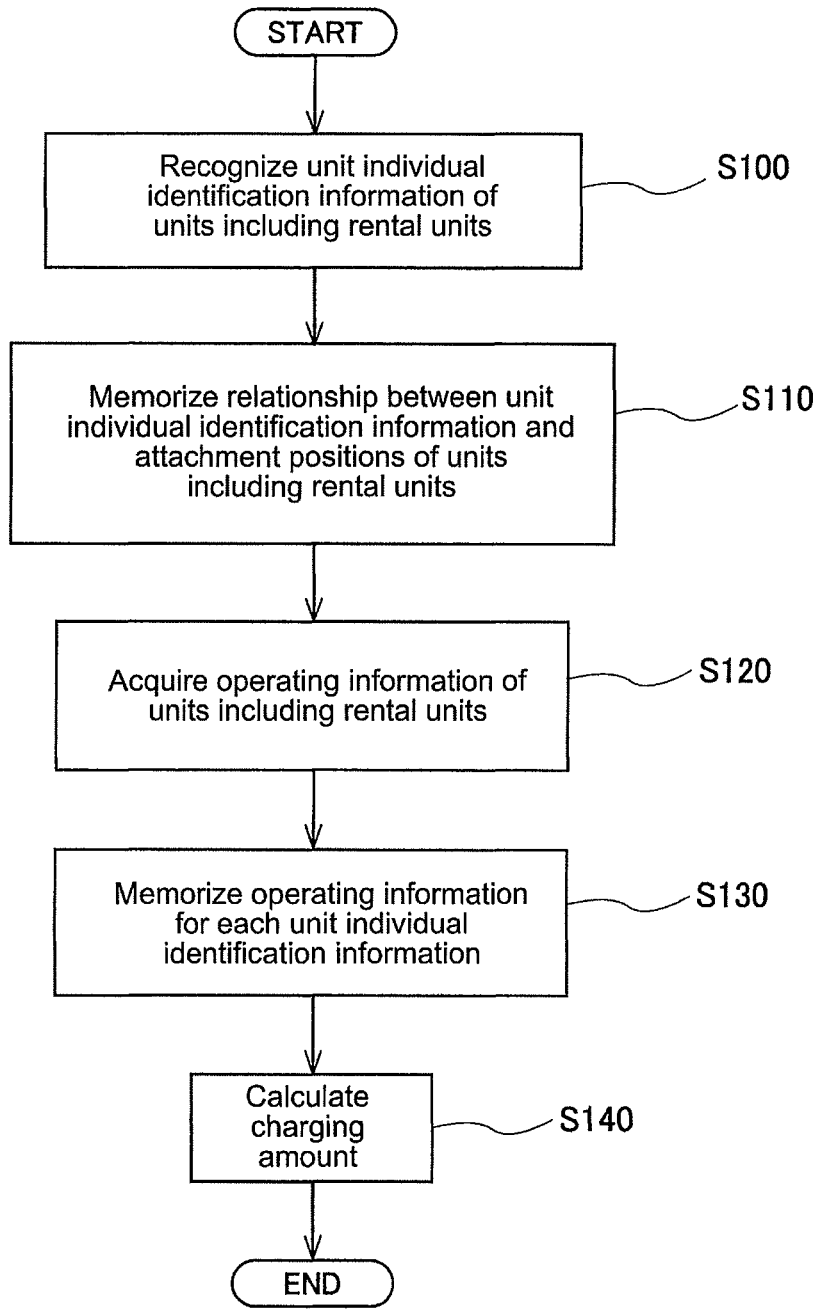
FIG. 6 is an example of an operation flowchart performed by the charging system of the embodiment.

At the rental destination, when the rented unit 4 is attached to substrate-related operation machine 10, recognizing section 51*a* of machine controller 51 of substrate-related operation machine 10 recognizes the unit individual identification information of all the units including rented unit 4 attached to main body 11 of substrate-related operation machine 10 (step S100 in the routine shown in FIG. 6). Further, machine controller 51 memorizes, on memory section 52, the attachment position on main body 11 of the attached units including rented unit 4 and the relationship to the unit individual identification information of that unit (step S110). Also, management server 60 memorizes, on second memory section 62, the unit individual identification of each unit for each substrate-related operation machine 10, the rental yes/no information, and the rental conditions information.

After the above attachment of rented units 4, recognizing of the unit individual identification information, and memorizing of the above relationships, production of substrate 2 using substrate-related operation machine 10 is started. Management server 60 of the rental destination issues a production command to machine controller 51 of substrate-related operation machine 10 in accordance with the production plan of substrate 2 or the like. Machine controller 51 of substrate-related operation machine 10 performs production by operating the units of the appropriate devices 20, 30, and 40 in accordance with production commands from management server 60.

Acquiring section 51*b* of machine controller 51 acquires operating information for each unit including the rented units (step S120) during production, and uploads log information including the operating information to management server 60. Note that, uploading log information to management server 60 from machine controller 51 may be performed for all units regardless of whether a unit is a rented unit 4. Further, this uploading of log information may be performed when power is turned on to substrate-related operation machine 10, when units of devices 20, 30, and 40 are automatically exchanged while substrate-related operation machine 10 is operating, when substrate-related operation machine 10 starts automatic operation, when substrate-related operation machine 10 ends automatic operation, when substrate-related operation machine 10 completes production of one substrate 2, or the like.

Management server 60 memorizes the log information sent for each substrate-related operation machine 10 in first memory section 61. Management server 60 extracts log information of the unit of the unit individual identification information indicating that the unit is a rented unit as the rental yes/no information memorized in second memory section 62 from the log information memorized in first memory section 61, and memorizes the log information in association with the unit individual identification information of the rented unit 4 in third memory section 63 (step S130).

Management server 60 transmits the log information of the rented unit 4 memorized in third memory section 63 to rental source server 80 at predetermined timings. When rental source server 80 receives the log information of the rented unit 4 from the rent destination management server 60 via network 70 by communication section 82, rental source server 80 extracts the operating information required for charging from the log information, refers to renting list 81, and reads out the rental conditions associated with the unit individual identification information of the rented unit 4. Charging section 83 multiplies the operating quantity of the extracted operating information by the charging unit price extracted from the read rental conditions to calculate the total charging amount (step S140). For example, if the charging unit price per unit operating time is fixed, the value obtained by multiplying the operating time and the charging unit price is calculated as the total charging amount. Further, if the charging unit price per operating quantity is determined, the value obtained by multiplying the operation number and the charging unit price is calculated as the total charging amount. The rental source sends an invoice for the calculated total charging amount to the rental destination.

3. Effects

As described above, in the present embodiment, at least one of all the units attached to main body 11 of substrate-related operation machine 10 can be lent as rented unit 4 from the rental source, which is the unit owner, to the rental destination, which is the user. Further, it is possible for the rental source to charge the rental destination for the rental of rented unit 4.

More specifically, in each of rental source server 80 on the rental source side and management server 60 on the rental destination side, rental conditions and the like for the lending of rented unit 4 are memorized, and in association with the unit individual identification information of the unit attached to substrate-related operation machine 10 managed by management server 60 on the rental destination side, rental yes/no information for distinguishing between rented units 4 and units other than rented units 4 is added. Further, substrate-related operation machine 10 of the rental destination recognizes the unit individual identification information of the attached units, and acquires operating information of each unit. Then, management server 60 extracts the log information of rented unit 4 from the log information of all the units attached to substrate-related operation machine 10 acquired at predetermined timings, associates the log information of the rented unit 4 with the unit individual identifying information, and transmits the log information to rental source server 80 of the rental source that has rented the rented unit 4. Further, rental source server 80 calculates the charging amount based on the operating information required for the charging included in the log information from management server 60, and performs the charging.

According to charging system 1, it is possible to construct a system in which, when at least one of all the units attached to substrate-related operation machine 10 is a rented unit 4, charging is performed in accordance with the operating of the rented unit 4. Thus, for example, by setting a unit less frequently used among all the units attached to substrate-related operation machine 10 as rented unit 4, it is possible to reduce the investment burden on the user of the substrate-related operation machine 10 compared to a case of purchasing all the units to be attached to substrate-related operation machine 10.

Further, in charging system 1, information transmitted from management server 60 of the rental destination to rental source server 80 of the rental source is not the log information of all the units acquired by management server 60 from the substrate-related operation machine 10, but only the log information of rented units 4 to be rented extracted from the log information of all the units. In this case, the rental source owner does not acquire the log information of all the units attached to substrate-related operation machine 10 of the user who is the rental destination, but acquires only the log information of the rented unit 4 that is to be rented. Accordingly, without the owner side knowing details of the entire substrate production by substrate-related operation machines 10 on the user side, information made known to the owner side can be limited to the information relating to rented units 4, so that the confidentiality of substrate production by substrate-related operation machines 10 on the user side can be ensured.

As is obvious from the above descriptions, charging system 1 of the present embodiment is a charging system for when at least one of the units attached to main body 11 in substrate-related operation machine 10 in which multiple units are detachably attached to main body 11 is rented unit 4. Charging system 1 is provided with: recognizing section 51a of machine controller 51 provided in control device 50 of main body 11 and configured to recognize unit individual identification information of rented unit 4 attached to main body 11; memory section 52 configured to memorize a relationship between an attachment position of main body 11 to which the rented unit 4 is attached and the unit individual identification information of the rented unit 4 attached to main body 11; acquiring section 51b of machine controller 51 provided in control device 50 and configured to acquire operating information of the rented unit 4 attached to main body 11; third memory section 63 configured to memorize the operating information of the rented unit 4 for each of the unit individual identification informations; and charging section 83 of rental source server 80 configured to calculate a charging amount based on the operating information memorized on third memory section 63.

A charging method according to charging system 1 is a charging method for when at least one of the units attached to main body 11 in substrate-related operation machine 10 in which multiple units are detachably attached to main body 11 is rented unit 4. The charging method includes: a first step of recognizing section 51a of machine controller 51 recognizing unit individual identification information of rented unit 4 attached to main body 11; a second step of memory section 52 memorizing a relationship between an attachment position of main body 11 to which the rented unit 4 is attached and the unit individual identification information of the rented unit 4 attached to main body 11; a third step of acquiring section 51b of machine controller 51 acquiring operating information of the rented unit 4 attached to the main body 11; a fourth step of third memory section 63 memorizing the operating information for each of the unit individual identification informations; and a fifth step of charging section 83 of rental source server 80 calculating a charging amount based on the operating information memorized on third memory section 63.

According to this configuration, when at least one of all the units attached to substrate-related operation machine 10 is a rented unit 4, it is possible to construct a system for charging in accordance with the operation of the rented unit 4.

Further, in charging system 1, charging section 83 is provided in rental source server 80 of the rental source for lending rented units 4 to the rental destination, and the operating information acquired by acquiring section 51b is transmitted to rental source server 80 via network 70 in association with the unit individual identification information of the rented unit 4 mounted on main body 11. According to this configuration, rental source server 80 of the rental source can perform the charging operation.

Further, in charging system 1, the operating information memorized in third memory section 63 is collectively transmitted to the rental source server 80 via network 70 at predetermined periods. According to this configuration, it is possible to prevent frequent communication between the rental destination side and the rental source side, thereby reducing the communication load.

Also, in charging system 1, the operating information of rented unit 4 includes the quantity of operations or the operating time of the rented unit 4. According to this configuration, it is possible to perform charging according to the quantity of operations or the operating time of the rented unit 4 mounted on main body 11 of substrate-related operation machine 10.

4. Alternative Embodiments

Note that, in an embodiment described above, management server 60 memorizes rental yes/no information indicating whether units configuring devices 20, 30, 40 and the like attached to main body 11 of substrate-related operation machine 10 are rented units 4. Also, machine controller 51 of control device 50 mounted on substrate-related operation machine 10 acquires the unit operating information of all units including rented units 4 using acquiring section 51b regardless of whether or not the unit is a rented unit 4, and memorizes the relationship between attachment position on main body 11 to which the unit is attached and the unit individual identification information of all units including rental units 4 on memory section 52. Further, management server 60 extracts the unit operating information of the rented unit 4 from the unit operating information of all the units.

However, the present disclosure is not limited to this configuration. The configuration may be such that the above rental yes/no information is memorized by machine controller 51 on the substrate-related operation machine side, machine controller 51 may determine whether a unit is a rented unit 4 based on the rental yes/no information, only the unit individual identification information of those rented units 4 may be acquired by acquiring section 51b, and then memory section 52 may memorize a relationship between the attachment position on main body 11 to which the rented unit 4 is attached and the unit individual identification information of that rented unit 4.

Further, in an embodiment above, calculation of the charging amount of rented unit 4 is performed such that the charging amount becomes higher as the operating quantity of rented unit 4 becomes larger, with the charging unit price being multiplied by the operating quantity. However, since the degree and severity of usage differ depending on the operating load of the rented unit 4, it may be appropriate to change the charging unit price per operating quantity. For example, it is appropriate to increase the charging unit price in a case of an operating load with a high degree of usage and to decrease the charging unit price in a case of an operating load with a low degree of usage, considering the maintainability of the rented unit 4 and the like.

Therefore, information indicating an operating load of the rented unit 4 together with the operating quantity of the rented unit 4 may be included in the information sent from management server 60 on the rental destination side to rental source server 80 on the rental source side in association with the unit individual identification information of the rented unit 4, and the calculation of the charging amount of the rented unit 4 may be performed while changing the charge unit price per operation amount in accordance with the operating load, that is, the operation speed, of the rented unit 4. For example, management server 60 on the rental destination side transmits, to rental source server 80, information including the operating time and the operating quantity calculated for each operating speed as shown in FIG. 5. Rental source server 80 memorizes in advance the charging unit price for each operating speed determined between the rental source and the rental destination. Charging section 83 has a unit price changing section, and the unit price changing section changes the charging unit price for each operating speed in the information sent from management server 60 on the rental destination side. Then, charging section 83 calculates the charging amount based on the operating time and the operating quantity for each operating speed.

For example, in a case where the total operating quantity N is (N1+N2+N3), assuming that when the operating speed is 100% the charging unit price is A1 and the operating quantity is N1, when the operating speed is 70% the charging unit price is A2 and the operating quantity is N2, and when the operation speed is 50% the charging unit price is A3 and the operating quantity is N3, the charging amount B is calculated according to the following equation (1).

$$B = A1 \times N1 + A2 \times N2 + A3 \times N3 \qquad (1)$$

Note that, the charging unit price may increase linearly as the operating load increases, may increase quadratically, or may increase logarithmically or exponentially. Further, the charging unit price may be determined for each range by dividing the operating speed into multiple ranges.

According to this alternative embodiment, since charging section 83 changes the charging unit price per one operating quantity in accordance with the operating load of rented unit 4 when performing the charging calculation of the rented unit 4, it is possible to perform the charging in accordance with the degree of usage of the rented unit 4.

Further, in an embodiment above, management server 60 on the rental destination side memorizes information indicating the rental conditions of rented unit 4. Here, is a case in which the rented unit 4 is attached to main body 11 of substrate-related operation machine 10 to be used, usage outside the rental conditions may be restricted or warnings may be issued. As described above, rental conditions include the rental period, the type and function of the target substrate-related operation machine 10, and the like.

Figure 7:
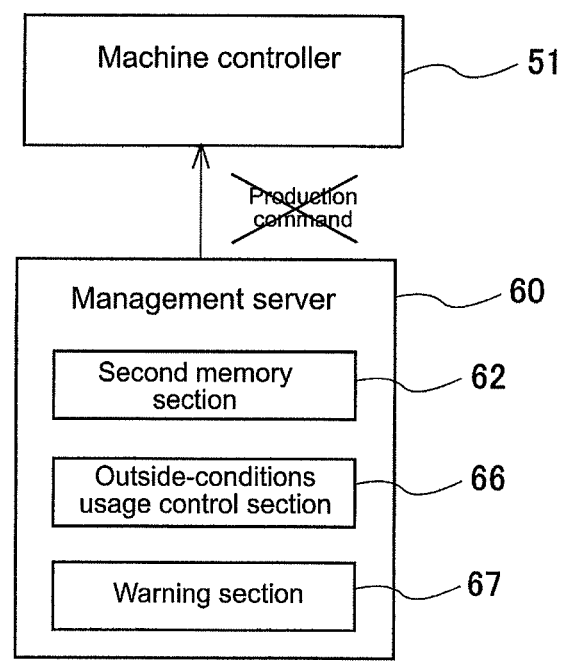
FIG. 7 illustrates usage control for the rental conditions of the rented unit at the substrate-related operation machine according to an alternative embodiment.

In this alternative embodiment, management server 60 includes outside-conditions usage control section 66 and warning section 67, as shown in FIG. 7. Outside-conditions usage control section 66 determines whether the rented unit 4 is being used outside the rental conditions according to the rental conditions of the rented unit 4 memorized in second memory section 62. Further, when it is determined that the rented unit 4 is not being used outside the rental conditions, the rented unit 4 is allowed to be used as usual and operation of the rented unit 4 is performed. On the other hand, when it is determined that the rented unit 4 is being used outside the rental conditions, the normal use of the rented unit 4 is restricted and operation of the rented unit 4 is stopped, as shown in FIG. 7. Alternatively, warning about usage of the rented unit 4 is issued by warning section 67 without restricting the normal use of the rented unit 4. Warning section 67 issues a warning to prompt the user to stop using the rented unit 4 outside the rental conditions, and is, for example, a warning display or a warning buzzer provided on management server 60.

According to the configuration of this alternative embodiment, since a restriction or a warning is issued with respect to usage of rented unit 4 which does not meet the predetermined rental conditions, it is possible to prompt the user to use the rented unit 4 within the rental conditions.

Further, in an embodiment above, information is directly exchanged between rental server 80 on the rental destination side that is renting rented unit 4 and management server 60 on the rental source side that is lending rented unit 4. However, the present disclosure is not limited to this configuration. In a case in which the rental source side that lends rental unit 4 and a supply source side that supplies (manufactures) the rented unit 4 are different, exchange of information between the rental source side and the rental destination side may be performed via the supply source side. Further, in this alternative embodiment, the rental destination side may transmit the log information of all the units in association with the unit individual identification information to the supply source side without distinguishing rented unit 4 from other units.

Figure 8:
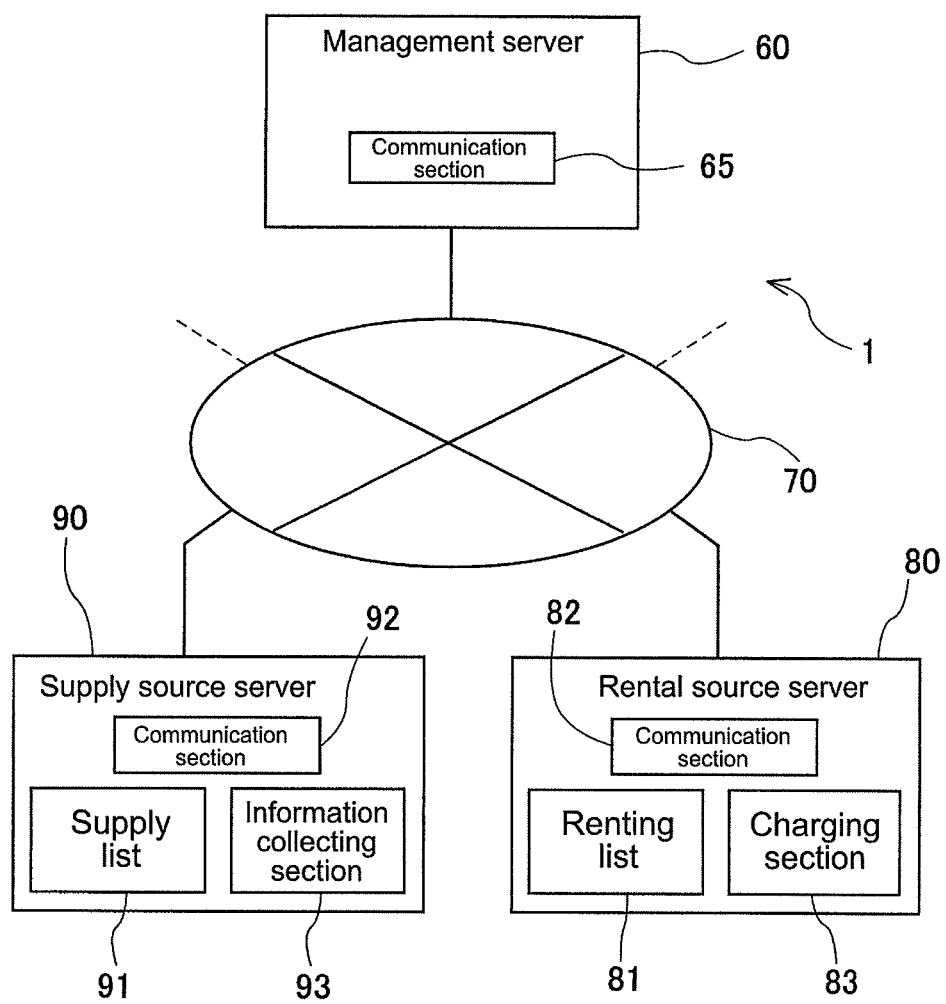
FIG. 8 is a configuration diagram of a charging system of a rented unit for a substrate-related operation machine according to an alternative embodiment.

In this alternative embodiment, as shown in FIG. 8, charging system 1 includes management server 60 on the rental destination side, rental server 80 on the rental source side, and supply source server 90 on the supply source side. Supply source server 90 is a host computer that performs management of units supplied from its own side (however, among units supplied from its own side, it is sufficient if this includes rented units 4 borrowed from the rental source to the rental destination). Supply source server 90 holds supply list 91. Supply list 91 is a list of supplied units, and associates, for each unit, a management number of the unit (that is, unit individual identification information), information indicating a supply destination, a rental source department in charge, and the like. Supply source server 90 includes communication section 92 that is communicatively connectable to network 70. Supply source server 90, using communication section 92, can receive log information including the operating information associated with the unit individual identification information of all the units from management server 60 of the rental destination side, and can transmit only log information including the operating information associated with the unit individual identification information of rented unit 4 out of the log information of all the units to the rental source server 80 of the side that lent the rented unit 4.

In this alternative embodiment, supply source server 90 of the supply source uses information collecting section 93 to collect log information of all units including the rented units 4 lent from the rental source side to the rental destination side attached to substrate-related operation machine 10. Further, log information of the rented unit 4 is extracted, and only the log information of the rented unit 4 is transmitted from communication section 92 to the rental source server 80 of the side that lent the rented unit. Charging section 83 of rental source server 80 performs a charging amount calculation for the lending of the rented unit 4 based on the log information including the operating information from supply source server 90.

According to this configuration, similar to an embodiment described above, when at least one of all the units attached to substrate-related operation machine 10 is a rented unit 4, it is possible to construct a system for charging in accordance with the operation of the rented unit 4. Further, according to this configuration, since the log information including the operating information of all the units attached to substrate-related operation machine 10 is gathered on the supply source side, the collected log information can be statistically analyzed to further develop a product and propose its use to the customer.

In an example above, component feeder 31, mounting head 43, a suction nozzle or gripping chuck held by mounting head 43, and the like are given as examples of a rented unit 4, but the configuration is not limited to this, and rented units 4 may be, for example, board conveyance device 20, component supply device 30, or component transfer device 40 itself, which is attached to main body 11.

Note that, the present disclosure is not limited to the above-described embodiments and variations, and various modifications can be made without departing from the spirit and scope of the present disclosure.

REFERENCE SIGNS LIST

1: charging system;
2: substrate;
3: component;
4: rented unit;
10: substrate-related operation machine;
11: main body;
20: substrate conveyance device;
30: component supply device;
40: component transfer device;
50: control device;
51: machine controller;
51*a*: recognizing section;
51*b*: acquiring section;
52: memory section;
60: management server;
61: first memory section;
62: second memory section;
63: third memory section;
70: network;
80: rental source server;
81: renting list;
83: charging section;
90: supply source server

The invention claimed is:

1. A charging system for a rented unit for a substrate-related operation machine, the substrate-related operation machine having a main body configured such that multiple units can be removably attached, at least one of the multiple units being a rented unit that is rented, the charging system comprising:
   a recognizing section provided on the main body and configured to recognize individual identification information of the rented unit attached to the main body;
   an attachment position information memory section configured to memorize a relationship between an attachment position of the main body to which the rented unit is attached and the individual identification information of the rented unit attached to the main body;
   an operating information acquiring section provided on the main body and configured to acquire operating information of the rented unit attached to the main body;
   an operating information memory section configured to memorize the operating information for each of the individual identification informations; and
   a charge calculating section configured to calculate a charging amount based on the operating information memorized on the operating information memory section.

2. The charging system for a rented unit for a substrate-related operation machine according to claim 1, wherein
   the charge calculating section is provided at a rental source side that rented the rented unit to a renter, and
   the operating information acquired by the operating information acquiring section is sent via a network to the charge calculating section in association with the individual identification information of the rented unit attached to the main body.

3. The charging system for a rented unit for a substrate-related operation machine according to claim 2, wherein the operating information memorized on the operating information memory section is sent periodically all at once via the network to the charge calculating section.

4. The charging system for a rented unit for a substrate-related operation machine according to claim 1, wherein
the operating information includes an operation quantity or an operating time period of the rented unit.

5. The charging system for a rented unit for a substrate-related operation machine according to claim 4, wherein
the operating information also includes an operating load of the rented unit, and
the charge calculating section includes a unit price changing section configured to change a charge unit price based on the operation quantity or the operating time period in accordance with the operating load.

6. The charging system for a rented unit for a substrate-related operation machine according to claim 1, further comprising:
a rental conditions information memory section configured to memorize rental condition information of the rented unit for each of the individual identification informations; and
an outside-conditions usage control section configured to issue a warning or restrict usage for a rented unit being used outside of rental conditions for that rented unit based on the rental condition information and the individual identification information of the rented unit recognized by the recognizing section.

7. The charging system for a rented unit for a substrate-related operation machine according to claim 1, wherein
a supply source side that supplies the substrate-related operation machine includes an information collecting section configured to collect an operating log of the substrate-related operation machine that includes the operating information of the rented unit, and
an information sending section configured to send the operating information of the rented unit among the operating logs collected by the information collecting section to the charge calculating section provided at the rental source side that rented the rented unit to the renter.

8. A charging method for a rented unit for a substrate-related operation machine, the substrate-related operation machine having a main body configured such that multiple units can be removably attached, at least one of the multiple units being a rented unit that is rented, the charging method comprising:
a first step of the main body recognizing individual identification information of the rented unit attached to the main body;
a second step of a rented unit attachment position information memory section memorizing a relationship between an attachment position of the main body to which the rented unit is attached and the individual identification information of the rented unit attached to the main body;
a third step of the main body acquiring operating information of the rented unit attached to the main body;
a fourth step of an operating information memory section memorizing the operating information for each of the individual identification information; and
a fifth step of a charge calculating section calculating a charging amount based on the operating information memorized on the operating information memory section.

* * * * *